United States Patent
Yi et al.

(10) Patent No.: US 11,575,148 B2
(45) Date of Patent: Feb. 7, 2023

(54) POROUS FILM AND LITHIUM-ION BATTERY

(71) Applicant: NINGDE AMPEREX TECHNOLOGY LIMITED, Ningde (CN)

(72) Inventors: Jianjian Yi, Ningde (CN); Xinzhi Zhang, Ningde (CN); Zengbin Wei, Ningde (CN); Xinghua Tao, Ningde (CN)

(73) Assignee: NINGDE AMPEREX TECHNOLOGY LIMITED, Ningde (CN)

(*) Notice: Subject to any disclaimer, the term of this patent is extended or adjusted under 35 U.S.C. 154(b) by 307 days.

(21) Appl. No.: 17/061,427

(22) Filed: Oct. 1, 2020

(65) Prior Publication Data
US 2021/0020981 A1 Jan. 21, 2021

Related U.S. Application Data

(63) Continuation of application No. 16/000,764, filed on Jun. 5, 2018, now Pat. No. 10,833,355.

(30) Foreign Application Priority Data

Apr. 11, 2018 (CN) .......................... 201810322931.1

(51) Int. Cl.
*H01M 10/0525* (2010.01)
*H01M 4/62* (2006.01)
(Continued)

(52) U.S. Cl.
CPC ....... *H01M 10/0525* (2013.01); *H01M 4/583* (2013.01); *H01M 4/623* (2013.01);
(Continued)

(58) Field of Classification Search
CPC .. H01M 10/0525; H01M 4/583; H01M 4/623; H01M 4/661; H01M 50/403;
(Continued)

(56) References Cited

U.S. PATENT DOCUMENTS

| 2010/0015515 A1 | 1/2010 | Takata et al. |
| 2015/0050545 A1 | 2/2015 | Murata et al. |

(Continued)

FOREIGN PATENT DOCUMENTS

| CN | 102939675 A | 2/2013 |
| CN | 103474602 A | 12/2013 |

(Continued)

OTHER PUBLICATIONS

Office action, CN201810322931.1, dated Aug. 19, 2021, 9 pgs.
(Continued)

*Primary Examiner* — Gary D Harris
(74) *Attorney, Agent, or Firm* — Morgan, Lewis & Bockius LLP

(57) ABSTRACT

A porous film, including a binder and inorganic particles. The porous film includes pores formed by the binder. The pores at least include a part of the inorganic particles. The inorganic particles have particle sizes that Dv10 is in a range of 0.015 μm to 3 μm, Dv50 is in a range of 0.2 μm to 5 μm, and Dv90 is in a range of 1 μm to 10 μm. Dv10 of the inorganic particles is less than Dv50 of the inorganic particles, and Dv50 of the inorganic particles is less than Dv90 of the inorganic particles, and the inorganic particles have particle sizes that the ratio of Dv90 to Dv10 is in a range of 2 to 100.

19 Claims, 2 Drawing Sheets

(51) Int. Cl.
  *H01M 4/583*  (2010.01)
  *H01M 4/66*   (2006.01)
  *H01M 50/403* (2021.01)
  *H01M 50/409* (2021.01)
  *H01M 4/02*   (2006.01)

(52) U.S. Cl.
  CPC ......... *H01M 4/661* (2013.01); *H01M 50/403* (2021.01); *H01M 50/409* (2021.01); *H01M 2004/027* (2013.01); *H01M 2004/028* (2013.01)

(58) Field of Classification Search
  CPC ......... H01M 50/409; H01M 2004/027; H01M 2004/028; H01M 50/426; H01M 50/443; H01M 50/491; H01M 50/417; H01M 50/431; H01M 50/446; H01M 50/44; Y02E 60/10
  USPC ....................................................... 429/209
  See application file for complete search history.

(56) References Cited

U.S. PATENT DOCUMENTS

2016/0181585 A1    6/2016  Choi et al.
2017/0194613 A1*   7/2017  Murata ................. H01M 50/42

FOREIGN PATENT DOCUMENTS

CN    104871341 A    8/2015
CN    104999745 A   10/2015
CN    205004376 U    1/2016

OTHER PUBLICATIONS

Yi, Office Action, U.S. Appl. No. 16/000,764, dated Apr. 22, 2020, 10 pgs.
Yi, Notice of Allowance, U.S. Appl. No. 16/000,764, dated Aug. 24, 2020, 8 pgs.

* cited by examiner

POROUS FILM AND LITHIUM-ION BATTERY

CROSS-REFERENCE TO RELATED APPLICATION

This application is a continuation application of U.S. patent application Ser. No. 16/000,764, filed on Jun. 5, 2018, which claims priority to Chinese Patent Application No. 201810322931.1 filed on Apr. 11, 2018, the contents of which are incorporated by reference herein.

TECHNICAL FIELD

The present application relates to the field of energy storage devices, and in particular, to a porous film and a lithium-ion battery.

BACKGROUND

Non-aqueous secondary batteries, particularly lithium-ion batteries, are widely used in portable electronic devices such as notebook computers, digital cameras, camcorders, and cellphones due to their high energy density and good rate performance. In recent years, the application of lithium-ion batteries as the power supply for new energy vehicles is also promoting the development of lithium-ion battery technology. In the cycle process of the lithium-ion battery, with the progress of charging and discharging, a gap will be created between the electrode and the separator, resulting in a reduction of the cycle capacity of the lithium-ion battery and thereby having an influence on its service life. Therefore, there is an urgent need for a technical solution to solve the problem of the gap issue between the separator and the electrode so as to improve the service life of the lithium-ion battery.

SUMMARY OF THE APPLICATION

In order to solve the problem in the prior art, a porous film and a lithium-ion battery are provided according to the present application.

According to a first aspect of the application, a porous film is provided, including: a binder; and inorganic particles, wherein the porous film contains pores formed by the binder, the pores at least includes a part of the inorganic particles, and the average wall thickness between the pores is in a range of 20 nm to 500 nm.

In the porous film described above, the porous film has an average pore size of 0.3 μm to 20 μm.

In the porous film described above, the inorganic particles have particle sizes such that particle size having a volume accumulation of 10% (Dv10) is in a range of 0.015 μm to 3 μm, particle size having a volume accumulation of 50% (Dv50) is in a range of 0.2 μm to 5 and particle size having a volume accumulation of 90% (Dv90) is in a range of 1 μm to 10 μm. Particle size having a volume accumulation of 10% (Dv10) refers to particle sizes which reach 10% of the cumulative volume from the side of small particle size in the granularity distribution on a volume basis. Particle size having a volume accumulation of 50% (Dv50) refers to particle sizes which reach 50% of the cumulative volume from the side of small particle size in the granularity distribution on a volume basis. Particle size having a volume accumulation of 90% (Dv90) refers to particle sizes which reach 90% of the cumulative volume from the side of small particle size in the granularity distribution on a volume basis.

In the porous film described above, particle size having a volume accumulation of 10% (Dv10) is less than particle size having a volume accumulation of 50% (Dv50), and particle size having a volume accumulation of 50% (Dv50) is less than particle size having a volume accumulation of 90% (Dv90).

In the porous film described above, the particle sizes of the inorganic particles satisfy that: the ratio of particle size having a volume accumulation of 90% (Dv90) to particle size having a volume accumulation of 10% (Dv10) is in a range of 2 to 100.

In the porous film described above, a pore size distribution coefficient (D) of the pores in the porous film is in a range of 1 to 5.

In the porous film described above, the inorganic particles are at least one of alumina, silica, magnesia, titanium oxide, hafnium dioxide, tin oxide, cerium dioxide, nickel oxide, zirconia, zinc oxide, calcium oxide, boehmite, aluminum hydroxide, magnesium hydroxide, calcium hydroxide, and barium sulfate.

In the porous film described above, the binder is at least one of polyvinylidene fluoride, vinylidene fluoride-hexafluoropropylene copolymer, polyamide, polyacrylonitrile, polyacrylate, polyacrylic acid, polyacrylic acid salt, sodium carboxymethylcellulose, polyvinylpyrrolidone, polyvinyl ether, polymethyl methacrylate, polytetrafluoroethylene and polyhexafluoropropylene.

In the porous film described above, the porous film has a porosity of 20% to 90%, and the porous film has a thickness of 0.2 to 10 μm.

In the porous film described above, a volume ratio of the inorganic particles to the binder is in a range of 0.2 to 3.0.

According to a second aspect of the application, a lithium-ion battery is provided, including: a positive electrode; a negative electrode; a separator arranged between the positive electrode and the negative electrode; and non-aqueous electrolyte; and a porous film, wherein the porous film is the porous film according to the first aspect of the application.

In the lithium-ion battery described above, the porous film is arranged on a surface of at least one of the positive electrode, the negative electrode and the separator.

The porous film provided by the application has excellent adhesion, and meanwhile the pore structure of the porous film can still be well maintained after being immersed in the electrolyte, thereby reducing the probability of pore blockage of the porous film and enabling the porous film to have high ionic conductivity. Therefore, the rate performance of the lithium-ion battery is greatly improved, and the provided lithium-ion battery has excellent rate performance and cycle performance.

BRIEF DESCRIPTION OF THE ACCOMPANYING DRAWINGS

DETAILED DESCRIPTION OF THE PREFERRED EXAMPLES

Figure 1:
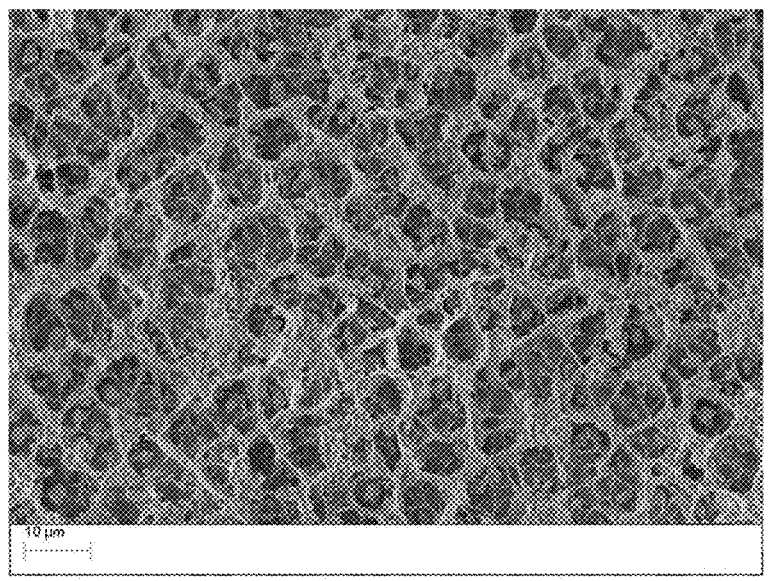
FIG. 1 is an electronic microscope image (1000 times magnification) of the pore structure of the lower surface (namely, the surface of the porous film away from the porous substrate) of the porous film according to example 3.
Figure 2:
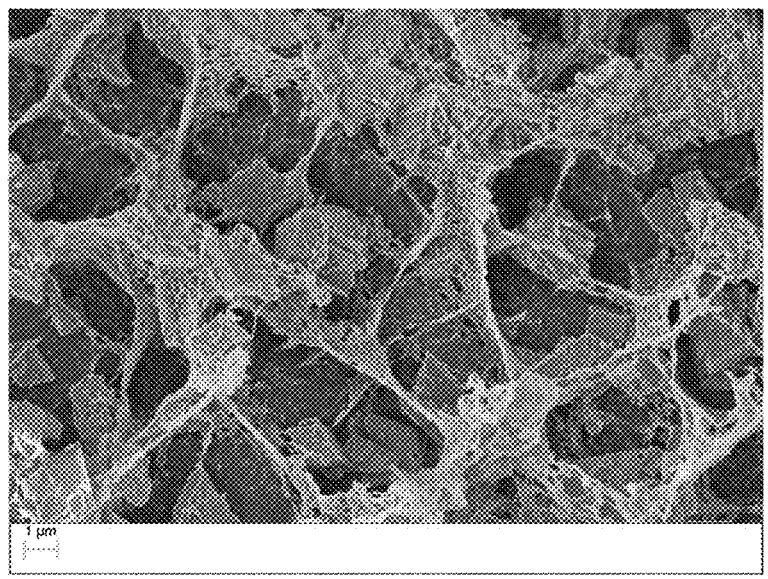
FIG. 2 is an electronic microscope image (5000 times magnification) of the pore structure of the lower surface of the porous film according to example 3.

Exemplary examples will be described in details below. While these exemplary examples may be implemented in various forms, the application should not be construed as limited to the examples of the application set forth herein. Rather, these examples are provided with the purpose of making the disclosure of the application thorough and complete and fully conveying the scope of the application to those skilled in the art.

According to a first aspect of the present application, a porous film is provided, including a binder and inorganic particles of different particle sizes, and the inorganic particles are fixed by the binder. Since the porous film includes the binder, the porous film has good adhesion, which can prevent the porous film from detaching during the use of the lithium-ion battery, and enables the lithium-ion battery to have a high safety performance. Moreover, the average pore size of the porous film is larger and the pore sizes are distributed uniformly, so that the porous film has good electrolyte diffusion and absorption capability and high ionic conductivity, the polarization reaction inside the lithium-ion battery can be reduced, thereby improving the rate performance of the lithium-ion battery. In addition, since the average wall thickness between the adjacent pores in the porous film is low, the binder (usually a polymer, for example, polyvinylidene fluoride) can be prevented from swelling in the electrolyte and blocking the pores of the porous film after the porous film is subjected to the soaking process in the electrolyte during the preparation of the lithium-ion battery. Therefore, the pore structure in the porous film can be more retained, smoothness of the lithium ion transport channel is ensured, and the polarization reaction inside the lithium-ion battery is reduced, thereby the rate performance of the lithium-ion battery can be further improved. In addition, due to the presence of inorganic particles in the porous film, the stability of the pore structure is enhanced. Therefore, the pore structure is not softened and closed after the soaking process in the electrolyte and the high-temperature and high-pressure process in the forming stage, the possibility of the pore structure being compressed and damaged is reduced, smoothness of the lithium ion transport channel is ensured, and the polarization reaction inside the lithium-ion battery is reduced, ensuring that the lithium-ion battery has a high rate performance.

In the porous film, inorganic particles are at least one of alumina, silica, magnesia, titanium oxide, hafnium dioxide, tin oxide, cerium dioxide, zirconia, nickel oxide, zinc oxide, calcium oxide, boehmite, aluminum hydroxide, magnesium hydroxide, calcium hydroxide, and barium sulfate. The inorganic particles may contain polar functional groups selected from a hydroxyl group. The surface of the inorganic particles containing polar functional groups is more easily combined with the non-solvent (third solvent) in the coagulating solution described below in the preparation process, which is advantageous for the diffusion of the third solvent into the porous film along the surface of the inorganic particles. Thus, large pore structures are formed in the vicinity of the inorganic particles, and the pore structures with large average pore sizes and small average wall thickness between the adjacent pores are easily obtained.

The particle sizes of the inorganic particles satisfy that the particle size having a volume accumulation of 10% (Dv10) is in a range of 0.015 μm to 3 μm, the particle size having a volume accumulation of 50% (Dv50) is in a range of 0.2 μm to 5 μm, and the particle size having a volume accumulation of 90% (Dv90) is in a range of 1 μm to 10 μm. The particle size (Dv10) having a volume accumulation of 10% refers to particle sizes which reach 10% of the cumulative volume from the side of small particle size in the granularity distribution on a volume basis. The particle size (Dv50) having a volume accumulation of 50% refers to particle sizes which reach 50% of the cumulative volume from the side of small particle size in the granularity distribution on a volume basis. The particle size (Dv90) having a volume accumulation of 90% refers to particle sizes which reach 90% of the cumulative volume from the side of small particle size in the granularity distribution on a volume basis. For example, the inorganic particles having large particle sizes and a narrow peak distribution are used, therefore the exchange speed between the non-solvent (third solvent) in the coagulation solution and the organic solvent (first solvent) in the coating solution can be increased during the formation of the porous film, and a porous film structure with a larger average pore size and smaller average wall thickness between the adjacent pores is formed. Within this range, if the particle sizes of the inorganic particles become smaller, the exchange speed between the non-solvent (third solvent) in the coagulation solution and the organic solvent (first solvent) in the coating solution is decreased during the formation of the porous film, the development of the pore structure is slower, the average pore size of the formed pore is decreased, and the average wall thickness between adjacent pores is increased. Conversely, if the particle sizes of the inorganic particles become larger, the exchange speed between the non-solvent (third solvent) in the coagulation solution and the organic solvent (first solvent) in the coating solution is increased, the development of the pore structure is faster, the average pore size of the formed pore is increased, and the average wall thickness between adjacent pores is decreased. However, if the particle sizes of the inorganic particles are too small and are beyond this range, the exchange between the non-solvent (third solvent) in the coagulation solution and the organic solvent (first solvent) in the coating solution will be adversely affected, and it is difficult to form a pore with a large average pore size. If the particle sizes of the inorganic particles are too large and are beyond this range, the surface of the formed porous film is not uniform, the strength of the porous film is decreased, and the adhesion force of the porous film is decreased.

In some examples, the inorganic particles have particle sizes such that Dv10 is in a range of 1.0 μm to 1.6 μm, Dv50 is in a range of 2.0 μm to 2.6 μm, and Dv90 is in a range of 3.0 μm to 4.0 μm.

In the above-described porous film, the particle size distribution of the inorganic particles satisfies Dv90/Dv10=2~100. If Dv90/Dv10 is greater than 100, which will lead to the particle size distribution of the inorganic particles being too wide, the uniformity of the formed pores is poor, and polarization reactions will easily occur in the lithium-ion battery.

In the above-described porous film, the average wall thickness between adjacent pores is in a range of 20 nm to 500 nm, and the average pore size of the porous film is in a range of 0.3 μm to 20 μm. The average pore size of the porous film according to the present application is larger, so that the porous film has good electrolyte diffusion and absorption capability and high ionic conductivity, and the polarization reaction inside the lithium-ion battery can be reduced, thereby improving the rate performance of the lithium-ion battery. In addition, since the average wall thickness between adjacent pores in the porous film is low, the binder (typically a polymer, for example, polyvinylidene fluoride) can be prevented from swelling in the electrolyte and blocking the pores of the porous film after the porous film is subject to a soaking process in the electrolyte during the preparation of the lithium-ion battery. Therefore, the pore structure in the porous film can be maintained, smoothness of the lithium ion transport channel is ensured and the polarization reaction inside the lithium-ion battery is reduced, the rate performance of the lithium-ion battery can be further improved.

In the above-described porous film, the pore size distribution coefficient D of the pores in the porous film is in a range of 1 to 5. R10 represents pore sizes which reach 10% of the cumulative pore sizes from the side of small pore size in the pore size distribution curve (the pore sizes of 10% of the pores are less than R10). R90 represents pore sizes which reach 90% of the cumulative pore sizes from the side of small pore size in the pore size distribution curve (the pore sizes of 90% of the pores are less than R90). The pore size distribution coefficient D is equal to R90/R10. The closer to 1 the pore size distribution coefficient D is, the more uniform the pore sizes in the porous film will be, and thus the porous film will have better rate performance and cycle performance.

In the above-mentioned porous film, the porous film has a thickness of 0.2 µm to 10 µm. If the thickness of the porous film is larger, the gas permeability of the porous film becomes deteriorated, and the rate performance of the lithium-ion battery is decreased. If the thickness of the porous film is smaller, the adhesive force of the porous film is reduced, and the porous film tends to fall off due to a poor adhesive force when applied in a lithium-ion battery, resulting in deteriorated safety performance of the lithium-ion battery. In some examples, the porous film has a thickness of 1 µm to 3 µm.

In the above-described porous film, the porous film has a porosity of 20% to 90%. In some examples, the porous film has a porosity of 40% to 60%.

In the above-described porous film, the binder is at least one of polyvinylidene fluoride, vinylidene fluoride-hexafluoropropylene copolymer, polyamide, polyacrylonitrile, polyacrylate, polyacrylic acid, polyacrylic acid salt, sodium carboxymethylcellulose, polyvinylpyrrolidone, polyvinyl ether, polymethyl methacrylate, polytetrafluoroethylene and polyhexafluoropropylene.

In the above-described porous film, the volume ratio of the inorganic particles to the binder in the porous film is in a range of 0.2 to 3.0. If the volume ratio of them is lower than 0.2, the average pore size of the porous film is reduced, the porosity is decreased, and the rate performance of the lithium-ion battery is deteriorated drastically. If the volume ratio of them is greater than 3.0, the adhesive force of the porous film is reduced. When the porous film is applied to a lithium-ion battery, the porous film tends to fall off due to poor adhesion, resulting in deteriorated safety performance of the lithium-ion battery.

According to a second aspect of the present application, a method for preparing a porous film is provided, which is used for preparing the porous film according to the first aspect of the present application, including steps of: (1) mixing inorganic particles with a binder, and then adding a first solvent and uniformly stirring the mixture to obtain a coating solution, wherein the binder is dissolved in the first solvent; (2) uniformly coating the coating solution on at least one surface of a substrate to form a wet film; (3) immersing the substrate with the wet film into a coagulation solution for phase transformation, wherein the coagulation solution includes a second solvent and a third solvent, and the second solvent and the third solvent are miscible with each other; (4) performing a drying process after the phase transformation is completed, to obtain the substrate whose surface is provided with a porous film, wherein the average wall thickness between adjacent pores in the porous film is in a range of 20 nm to 500 nm, and the average pore size of the porous film is not less than 0.3 µm.

The above-mentioned substrate may be one of a separator, a positive electrode, and a negative electrode.

In the above-described method for preparing the porous film, the porous film is prepared using the principle of phase transformation (i.e., non-solvent induced phase separation, NIPS). In the coating solution obtained in the step (1), the first solvent is oily, and the binder (for example, polyvinylidene fluoride) may be dissolved in the first solvent. The third solvent contained in the coagulation solution in step (3) is one or more selected from deionized water, ethanol, propanol, acetone, dimethyl carbonate and diethyl carbonate, and the binder is insoluble in the third solvent (for example, deionized water). Therefore, after the coating solution is coated on the substrate and then immersed in the coagulation solution, since the first solvent in the coating solution is extracted into the third solvent (for example, deionized water) in the coagulation solution, the binder in the coating solution is coagulated and separated out, thus forming a porous film.

In the above-described preparation method for the porous film, in step (1), the first solvent is at least one of N-methylpyrrolidone (NMP), dimethylacetamide (DMAC), dimethylformamide (DMF), triethyl phosphate (TEP), and dimethyl sulfoxide (DMSO). The porous film formed using NMP has the largest average pore size and the highest porosity, the porous film formed using DMF has the smallest average pore size and the lowest porosity, and the porous film formed using DMAC has the average pore size and a porosity between that of the porous films formed using NMP and DMF respectively.

In the above-described method for preparing the porous film, the solid content of the coating solution in step (1) is in a range of 7% to 25%. Within this range, if the solid content of the coating solution is increased, the viscosity of the coating solution is increased, the exchange speed between the third solvent in the coagulation solution and the first solvent in the coating solution becomes lower, and both the average pore size and porosity of the formed porous film are decreased. Conversely, if the solid content of the coating solution is decreased, both the average pore size and porosity of the porous film are increased. However, if the solid content of the coating solution is too high and is beyond this range, the porous film cannot meet the requirement of gas permeability, and the porous film cannot be used in the lithium-ion battery; if the solid content of the coating solution is too low and is below this range, the strength of the porous film is decreased, and it is difficult to form a film on the surface of the substrate. In some examples, the coating solution has a solid content of 10% to 20%.

In the above-described method for preparing the porous film, the temperature of the coating solution in step (1) is in a range of 15 degrees Celsius to 30 degrees Celsius. In some examples, the temperature of the coating solution is in a range of 20 degrees Celsius to 25 degrees Celsius.

In the above-described method for preparing the porous film, the coating of the coating solution in step (2) may be performed using a common coating method, such as roll coating, a gas knife coating, rod coating, scraper coating, gravure coating, screen coating, die coating, micro gravure coating, dip coating or the like. In some examples, the dip coating method is selected as the coating method of the coating solution.

In the above-described preparation method, the second solvent in step (3) is one or more selected from N-methylpyrrolidone (NMP), dimethylacetamide (DMAC), dimethylformamide (DMF), triethyl phosphate (TEP), and dimethyl sulfoxide (DMSO). The second solvent in step (3) may be the same as the first solvent added in step (1).

In the above-described preparation method, in step (3), the mass percentage of the second solvent in the coagulation solution is in a range of 20% to 60%. If the content of the second solvent in the coagulation solution is decreased, it is advantageous for the increase of the average pore size and porosity of the porous film. However, if the content of the second solvent is too low, a dense skin may be formed on the surface of the porous film which is away from the substrate, resulting in deteriorated gas permeability of the porous film. If the content of the second solvent is too high, a complete porous structure cannot be formed or the formed porous film has a very low average pore size and a high wall thickness. In some examples, the mass percentage of the second solvent in the coagulation solution is in a range of 30% to 40%.

In the above-described method for preparing the porous film, the temperature of the coagulation solution in step (3) is in a range of 15 degrees Celsius to 30 degrees Celsius. In some examples, the temperature of the coagulation solution is in a range of 20 degrees Celsius to 25 degrees Celsius.

In the above-described method for preparing the porous film, in step (3), the period for phase transformation is in a range of 10 s to 90 s. In some examples, the period for phase transformation is in a range of 20 s to 60 s.

In the above-described method for preparing the porous film, in step (4), the drying temperature is in a range of 60 degrees Celsius to 70 degrees Celsius, and the drying period is less than 1 min.

According to a third aspect of the present application, a separator including the porous film according to the first aspect of the present application is provided.

The separator includes a porous substrate and a porous film. The porous film is arranged on the surface of the porous substrate. In the above-described separator, there is no particular limitation on the type of the porous substrate, and it may be selected as actually required. Specifically, the porous substrate is at least one of polyethylene film (PE), polypropylene film (PP), polyethylene/polypropylene dual-layer film (PE/PP), polypropylene/polyethylene/polypropylene three-layer film (PP/PE/PP), non-woven fabric, polyimide, polyacrylonitrile porous film (PAN), and glass fiber film.

A method for preparing the above-described separator is further provided according to the present application, which is used for preparing the separator according to the third aspect of the present application, and which includes steps of: (1) mixing inorganic particles with a binder, and then adding a first solvent and uniformly stirring the mixture to obtain a coating solution, wherein the binder is dissolved in the first solvent; (2) uniformly coating the coating solution on a surface of the porous substrate (for example, polyethylene) to form a wet film; (3) immersing the porous substrate (for example, polyethylene) with the wet film into a coagulation solution for phase transformation, wherein the coagulation solution includes a second solvent and a third solvent, and the second solvent and the third solvent are miscible with each other; (4) performing a drying process after the phase transformation is completed to obtain a separator in which a porous film is arranged on the surface of the porous substrate (for example, polyethylene), wherein the average wall thickness between adjacent pores in the porous film is in a range of 20 nm to 500 nm, and the average pore size of the porous film is not less than 0.3 μm.

In the above-described method for preparing the separator, the parameter setting of the preparation process is consistent with that of the preparation process of the porous film according to the second aspect of the present application, and only the substrate is changed to porous substrate.

According to a fourth aspect of the present application, an electrode including the porous film according to the first aspect of the present application is provided. The electrode includes a current collector and an active material layer. The active material layer is arranged on the surface of the current collector, and the porous film is arranged on the surface of the active material layer which is away from the current collector.

In the above-described electrode, the electrode may be either a positive electrode or a negative electrode, depending on the current collector and the active material used. There is no particular limitation on the type of the current collector, and it can be selected as actually required. Specifically, the current collector is at least one of aluminum foil, copper foil, nickel foil, titanium foil, silver foil, nickel-copper alloy foil, aluminum-zirconium alloy foil, stainless steel foil and graphene film.

A method for preparing an electrode is further provided according to the application, which is used for preparing the electrode according to the fourth aspect of the present application, including steps of: (1) mixing inorganic particles with a binder, and then adding a first solvent and uniformly stirring the mixture to obtain a coating solution, wherein the binder is dissolved in the first solvent; (2) mixing an active material, a conductive agent and a binder, adding an organic solvent (such as N-methylpyrrolidone) into the mixture, uniformly stirring the mixture under the action of a vacuum stirrer to obtain an electrode slurry, and uniformly coating the electrode slurry on the current collector and then drying to form an active material layer (electrode) on the current collector; (3) uniformly coating the coating solution on the surface of the electrode to form a wet film; (4) immersing the electrode with the wet film into a coagulation solution for phase transformation, wherein the coagulation solution includes a second solvent and a third solvent, and the second solvent and the third solvent are miscible with each other; (5) performing a drying process after the phase transformation to obtain an electrode whose surface is provided with a porous film, wherein the average wall thickness between adjacent pores in the porous film is in a range of 20 nm to 500 nm, and the average pore size of the porous film is not less than 0.3 μm. The electrode may be either a positive electrode or a negative electrode.

In the method for preparing the electrode described above, the parameter setting of the preparation process is consistent with that of the preparation process of the porous film according to the second aspect of the present application.

According to a fifth aspect of the present application, a lithium-ion battery is provided. The lithium-ion battery includes the separator according to the third aspect of the present application, or includes the electrode according to the fourth aspect of the present application, or includes both the separator according to the third aspect of the present application and the electrode according to the fourth aspect of the present application. The electrode may be either a positive electrode or a negative electrode.

In the above-described lithium-ion battery, the positive electrode includes a positive electrode material capable of intercalation and deintercalation of lithium (Li) (hereinafter sometimes referred to as "positive electrode material capable of intercalation/deintercalation of lithium (Li)"). Examples of the positive electrode material capable of intercalation/deintercalation of lithium (Li) may include one or more of lithium cobaltate, nickel cobalt lithium manganate, nickel cobalt lithium aluminate, lithium manganate, iron manganese lithium phosphate, lithium vanadium phosphate, lithium oxide vanadium phosphate, lithium iron phosphate, lithium titanate, and lithium-rich manganese-based materials.

In the above-mentioned positive electrode material, the chemical formula of lithium cobaltate may be expressed as $Li_xCo_aM1_bO_{2-c}$, wherein M1 represents at least one selected from the group consisting of nickel (Ni), manganese (Mn), magnesium (Mg), aluminum (Al), boron (B), titanium (Ti), vanadium (V), chromium (Cr), ferrum (Fe), copper (Cu), zinc (Zn), molybdenum (Mo), tin (Sn), calcium (Ca), strontium (Sr), tungsten (W), yttrium (Y), lanthanum (La), zirconium (Zr), and silicon (Si), and the values of x, a, b, and c are respectively within the following ranges: $0.8 \leq x \leq 1.2$, $0.8 \leq a \leq 1$, $0 \leq b \leq 0.2$, $-0.1 \leq c \leq 0.2$.

In the above-mentioned positive electrode material, the chemical formula of nickel cobalt lithium manganate or nickel cobalt lithium aluminate may be expressed as $Li_yNi_dM2_eO_{2-f}$, wherein M2 represents at least one selected from the group consisting of cobalt (Co), manganese (Mn), magnesium (Mg), aluminum (Al), boron (B), titanium (Ti), vanadium (V), chromium (Cr), ferrum (Fe), copper (Cu), zinc (Zn), molybdenum (Mo), tin (Sn), calcium (Ca), yttrium (Sr), tungsten (W), zirconium (Zr), and silicon (Si), and the values of y, d, e, and f are respectively within the following ranges: $0.8 \leq y \leq 1.2$, $0.3 \leq d \leq 0.98$, $0.02 \leq e \leq 0.7$, $-0.1 \leq f \leq 0.2$.

In the above-mentioned positive electrode material, the chemical formula of lithium manganate is expressed as $Li_zMn_{2-g}M3_gO_{4-h}$, wherein M3 represents at least one selected from the group consisting of cobalt (Co), nickel (Ni), magnesium (Mg), aluminum (Al), boron (B), titanium (Ti), vanadium (V), chromium (Cr), ferrum (Fe), copper (Cu), zinc (Zn), molybdenum (Mo), tin (Sn), calcium (Ca), strontium (Sr), and tungsten (W), and the values of z, g and h are respectively within the following ranges: $0.8 \leq z \leq 1.2$, $0 \leq g < 1.0$, and $-0.2 \leq h \leq 0.2$.

The negative electrode includes a negative electrode material capable of intercalation and deintercalation of lithium (Li) (hereinafter, sometimes referred to as "negative electrode material capable of intercalation/deintercalation of lithium (Li)"). Examples of the negative electrode material capable of intercalation/deintercalation of lithium (Li) may include a carbon material, a metal compound, an oxide, a sulfide, a nitride of lithium such as $LiN_3$, lithium metal, a metal which formed an alloy with lithium, and a polymer material. Examples of carbon materials may include low graphitized carbon, easily graphitized carbon, artificial graphite, natural graphite, mesocarbon microbeads, soft carbon, hard carbon, pyrolytic carbon, coke, glassy carbon, organic polymer compound sintered body, carbon fiber and active carbon. Wherein coke may include pitch coke, needle coke, and petroleum coke. The organic polymer compound sintered body refers to materials obtained by calcining a polymer material such as a phenol plastic or a furan resin at a suitable temperature and carbonizing them, and some of these materials are classified into low graphitized carbon or easily graphitized carbon. Examples of polymeric materials may include polyacetylene and polypyrrole.

Among these negative electrode materials capable of intercalation/deintercalation of lithium (Li), further, materials whose charge and discharge voltages are close to the charge and discharge voltages of lithium metal are selected. This is because that the lower the charge and discharge voltages of the negative electrode material are, the more easily the battery can have a higher energy density. The carbon material can be selected as the negative electrode material, since the crystal structure of the carbon material has only small changes during charging and discharging. Therefore, good cycle characteristics and high charge and discharge capacities can be obtained. In particular, graphite can be selected, since it can provide a high electrochemical equivalent and energy density.

In addition, the negative electrode material capable of intercalation/deintercalation of lithium (Li) may include elemental lithium metal, metal elements and semi-metal elements capable of forming an alloy together with lithium (Li), alloys and compounds including such elements, etc. In particular, they are used together with the carbon material, since good cycle characteristics and high energy density can be obtained in this case. In addition to alloys including two or more metal elements, alloys used herein further include alloys including one or more metal elements and one or more semi-metal elements. The alloys may be in the following forms of solid solutions, eutectic crystals (eutectic mixtures), intermetallic compounds, and mixtures thereof. Examples of metal elements and semi-metal elements may include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y), and hafnium (Hf). Examples of the above-described alloys and compounds may include a material expressed as a chemical formula: $Ma_sMb_tLi_u$, and a material expressed as a chemical formula: $Ma_pMc_qMd_r$. In these chemical formulas, Ma represents at least one of metal elements and semi-metal elements capable of forming alloys with lithium, Mb represents at least one of these metal elements and semi-metal elements other than lithium and Ma, Mc represents at least one of the non-metal elements, Md represents at least one of these metal elements and semi-metal elements other than Ma, and s, t, u, p, q, and r satisfy $s>0$, $t \geq 0$, $u \geq 0$, $p>0$, $q>0$, and $r \geq 0$, respectively. In addition, an inorganic compound that does not include lithium (Li) may be used in the negative electrode, such as $MnO_2$, $V_2O_5$, $V_6O_{13}$, NiS, and MoS.

The lithium-ion battery described above further includes an electrolyte, which may be one or more of a gel electrolyte, a solid electrolyte, and an liquid electrolyte. The liquid electrolyte includes a lithium salt and a non-aqueous solvent.

The lithium salt is at least one of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, and lithium difluoborate. For example, $LiPF_6$ is used as a lithium salt, since it can provide high ionic conductivity and improve cycle performance.

The non-aqueous solvent may be a carbonate compound, a carboxylic acid ester compound, an ether compound, other organic solvents or combinations thereof.

The carbonate compound may be a chain carbonate compound, a cyclic carbonate compound, a fluorinated carbonate compound or combinations thereof.

Examples of chain carbonate compounds include diethyl carbonate (DEC), dimethyl carbonate (DMC), dipropyl carbonate (DPC), methylpropyl carbonate (MPC), ethyl propyl carbonate (EPC), methyl ethyl carbonate (MEC) and combinations thereof. Examples of the cyclic carbonate compounds include ethylene carbonate (EC), propylene carbonate (PC), butylene carbonate (BC), vinyl ethylene carbonate (VEC), and combinations thereof. Examples of the fluorocarbonate compound include fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethyl carbonate, 1-fluoro-1-methylethylene carbonate, 1,2-difluoro-1-methylethylene carbonate, 1,1,2-trifluoro-2-methylethyl carbonate, trifluoromethyl ethylene carbonate, and combinations thereof.

Examples of carboxylic acid ester compounds include methyl acetate, ethyl acetate, n-propyl acetate, tert-butyl acetate, methyl propionate, ethyl propionate, γ-butyrolactone, decanolactone, valerolactone, mevalonolactone, caprolactone, methyl formate, and combinations thereof.

Examples of ether compounds include dibutyl ether, tetraethylene glycol dimethyl ether, diethylene glycol dimethyl ether, 1,2-dimethoxyethane, 1,2-diethoxyethane, ethoxy methoxy ethane, 2-methyltetrahydrofuran, tetrahydrofuran, and combinations thereof.

Examples of other organic solvents include dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate esters, and combinations thereof.

The electrode assembly of the lithium-ion battery to which the porous film of the present application is applied includes not only a wound type electrode assembly, but also a laminated (stacked) type electrode assembly and a folded type electrode assembly.

The present application is further described in details with examples below. It should be understood that these examples are only for illustrating the application but are not intended to limit the scope of the application. In the examples, only the case where the electrode assembly of the lithium-ion battery is wound type is illustrated, but the application is not limited thereto.

In the following examples, reagents, materials, and instruments used are commercially available unless otherwise specified.

Example 1

(1) Preparation of Negative Electrode

The negative electrode active material (artificial graphite), the binder (styrene-butadiene rubber), and the conductive agent (conductive carbon black (Super P)) are mixed uniformly with deionized water at a mass ratio of 92:3:5 to prepare a negative electrode slurry, then the negative electrode slurry is coated uniformly on front and rear surfaces of the negative electrode current collector copper foil, then a negative electrode active material layer is formed by drying the coated negative electrode current collector copper foil at 85 degrees Celsius, followed by cold pressing, slitting and cutting processes and a negative electrode tab is welded so as to obtain a negative electrode.

(2) Preparation of Positive Electrode

The positive electrode active material (lithium cobaltate ($LiCoO_2$)), the binder (polyvinylidene fluoride (PVDF)) and the conductive agent (conductive carbon black (Super P)) are dissolved in the solvent (N-methylpyrrolidone (NMP)) at a mass ratio of 97:1.5:1.5. A positive electrode slurry is prepared by stirring uniformly the mixture, then the positive electrode slurry is coated uniformly on front and rear surfaces of the positive electrode current collector aluminum foil, then a positive electrode active material layer is formed by drying the coated positive electrode current collector aluminum foil at 85 degrees Celsius, followed by cold pressing, slitting and cutting processes and a positive electrode tab is welded so as to obtain a positive electrode.

(3) Preparation of Separator

Inorganic particles (boehmite) are mixed with the binder (polyvinylidene fluoride) at a volume ratio of 1.2, and then N-methylpyrrolidone (first solvent) is added and uniformly stirred to obtain a coating solution, wherein the coating solution has a solid content of 7%. The coating solution is coated onto a porous substrate (polyethylene) using the dip coating method to form a wet film. The porous substrate (polyethylene) with a wet film is immersed in a coagulation solution containing deionized water (third solvent) and N-methylpyrrolidone (NMP, second solvent) for phase transformation, wherein the mass percentage of N-methylpyrrolidone (second solvent) in the coagulation solution is 40%, and the coating solution and the coagulation solution are at the temperature of 25 degrees Celsius. After being immersed in the coagulation solution for 30 seconds, the porous substrate (polyethylene) with a wet film is dried in an oven at 60 degrees Celsius to obtain a separator with a porous film. The particle size distribution of inorganic particles (boehmite) is such that Dv10 is 0.9 μm, Dv50 is 1.8 μm and Dv90 is 3.0 μm.

(4) Preparation of Electrolyte

A solution prepared with lithium salt $LiPF_6$ and a non-aqueous organic solvent (ethylene carbonate (EC): diethyl carbonate (DEC): ethyl methyl carbonate (EMC): vinylene carbonate (VC)=8:85:5:2, by mass ratio) at a mass ratio of 8:92 is used as the electrolyte.

(5) Preparation of Lithium-Ion Battery

An electrode assembly is obtained by winding the positive electrode, the separator and the negative electrode, and followed by packaging, injection of the electrolyte, forming, and suction molding processes are performed to obtain the lithium-ion battery.

Example 2

In this example, the preparation methods for the negative electrode, the positive electrode, the electrolyte, and the lithium-ion battery are the same as the corresponding preparation methods described in Example 1. The preparation method of the separator is the same as that described in Example 1, except that the solid content of the coating solution is 10%.

Example 3

In this example, the preparation methods for the negative electrode, the positive electrode, the electrolyte, and the lithium-ion battery are the same as the corresponding preparation methods described in Example 1. The preparation method of the separator is the same as that described in Example 1, except that the solid content of the coating solution is 15%.

Example 4

In this example, the preparation methods for the negative electrode, the positive electrode, the electrolyte, and the lithium-ion battery are the same as the corresponding preparation methods described in Example 1. The preparation method of the separator is the same as that described in Example 1, except that the solid content of the coating solution is 20%.

Example 5

In this example, the preparation methods for the negative electrode, the positive electrode, the electrolyte, and the lithium-ion battery are the same as the corresponding preparation methods described in Example 1. The preparation method of the separator is the same as that described in Example 1, except that the solid content of the coating solution is 25%.

Example 6

In this example, the preparation methods for the negative electrode, the positive electrode, the electrolyte, and the lithium-ion battery are the same as the corresponding preparation methods described in Example 1. The preparation method of the separator is the same as that described in Example 1, except that the solid content of the coating solution is 15%, and dimethylacetamide (DMAC) is selected as the second solvent.

Example 7

In this example, the preparation methods for the negative electrode, the positive electrode, the electrolyte, and the lithium-ion battery are the same as the corresponding preparation methods described in Example 1. The preparation method of the separator is the same as that described in Example 1, except that the solid content of the coating solution is 15%, and dimethylformamide (DMF) is selected as the second solvent.

Example 8

In this example, the preparation methods for the negative electrode, the positive electrode, the electrolyte, and the lithium-ion battery are the same as the corresponding preparation methods described in Example 1. The preparation method of the separator is the same as that described in Example 1, except that the solid content of the coating solution is 15%, and the particle size distribution of inorganic particles (boehmite) is that Dv10 is 0.015 μm, Dv50 is 0.2 μm and Dv90 is 1.5 μm.

Example 9

In this example, the preparation methods for the negative electrode, the positive electrode, the electrolyte, and the lithium-ion battery are the same as the corresponding preparation methods described in Example 1. The preparation method of the separator is the same as that described in Example 1, except that the solid content of the coating solution is 15%, and the particle size distribution of inorganic particles (boehmite) is that Dv10 is 0.2 μm, Dv50 is 1.0 μm and Dv90 is 2.0 μm.

Example 10

In this example, the preparation methods for the negative electrode, the positive electrode, the electrolyte, and the lithium-ion battery are the same as the corresponding preparation methods described in Example 1. The preparation method of the separator is the same as that described in Example 1, except that the solid content of the coating solution is 15%, and the particle size distribution of inorganic particles (boehmite) is that Dv10 is 1.6 μm, Dv50 is 2.6 μm and Dv90 is 4.6 μm.

Example 11

In this example, the preparation methods for the negative electrode, the positive electrode, the electrolyte, and the lithium-ion battery are the same as the corresponding preparation methods described in Example 1. The preparation method of the separator is the same as that described in Example 1, except that the solid content of the coating solution is 15%, and the particle size distribution of inorganic particles (boehmite) is that Dv10 is 2.2 μm, Dv50 is 3.5 μm and Dv90 is 5.8 μm.

Example 12

In this example, the preparation methods for the negative electrode, the positive electrode, the electrolyte, and the lithium-ion battery are the same as the corresponding preparation methods described in Example 1. The preparation method of the separator is the same as that described in Example 1, except that the solid content of the coating solution is 15%, and the particle size distribution of inorganic particles (boehmite) is that Dv10 is 3.0 μm, Dv50 is 5.0 μm and Dv90 is 10.0 μm.

Example 13

In this example, the preparation methods for the negative electrode, the positive electrode, the electrolyte, and the lithium-ion battery are the same as the corresponding preparation methods described in Example 1. The preparation method of the separator is the same as that described in Example 1, except that the solid content of the coating solution is 15%, and the mass percentage of N-methylpyrrolidone in the coagulation solution is 20%.

Example 14

In this example, the preparation methods for the negative electrode, the positive electrode, the electrolyte, and the lithium-ion battery are the same as the corresponding preparation methods described in Example 1. The preparation method of the separator is the same as that described in Example 1, except that the solid content of the coating solution is 15%, and the mass percentage of N-methylpyrrolidone in the coagulation solution is 60%.

Example 15

In this example, the preparation methods for the negative electrode, the positive electrode, the electrolyte, and the lithium-ion battery are the same as the corresponding preparation methods described in Example 1. The preparation method of the separator is the same as that described in Example 1, except that the solid content of the coating solution is 15%, alumina is selected as inorganic particles, and the particle size distribution of alumina particles is that Dv10 is 0.9 μm, Dv50 is 1.8 μm and Dv90 is 3.0 μm.

Example 16

In this example, the preparation methods for the negative electrode, the positive electrode, the electrolyte, and the lithium-ion battery are the same as the corresponding preparation methods described in Example 1. The preparation method of the separator is the same as that described in Example 1, except that the solid content of the coating solution is 15%, magnesium hydroxide is selected as inorganic particles, and the particle size distribution of magnesium hydroxide particles is that Dv10 is 0.9 μm, Dv50 is 1.8 μm and Dv90 is 3.0 μm.

Example 17

(1) Preparation of Negative Electrode

The negative electrode active material (artificial graphite), the binder (styrene-butadiene rubber), and the conductive agent (conductive carbon black (Super P)) are mixed uniformly with deionized water at a mass ratio of 92:3:5 to prepare a negative slurry, then the negative slurry is coated uniformly on front and rear surfaces of the negative electrode current collector copper foil, then a negative electrode active material layer is formed by drying the coated negative electrode current collector copper foil at 85 degrees Celsius, followed by cold pressing, slitting and cutting processes and a negative electrode tab is welded to obtain a negative electrode.

(2) Preparation of Positive Electrode

The positive electrode active material (lithium cobaltate ($LiCoO_2$)), the binder (polyvinylidene fluoride (PVDF)), and the conductive agent (conductive carbon black (Super P)) are dissolved in the solvent (N-methylpyrrolidone (NMP)) at a mass ratio of 97:1.5:1.5. A positive slurry is prepared by stirring uniformly the mixture, then the positive slurry is coated uniformly on front and rear surfaces of the positive electrode current collector (aluminum foil), then a positive electrode active material layer is formed by drying the coated positive electrode current collector aluminum foil at 85 degrees Celsius. Inorganic particles (boehmite) are mixed with the binder PVDF at a volume ratio of 1.2, and then N-methylpyrrolidone (first solvent) is added and uniformly stirred to obtain a coating solution, wherein the coating solution has a solid content of 15%. The coating solution is coated onto the positive electrode current collector on which a positive electrode active material layer is arranged by the dip coating method to form a wet film. The positive electrode current collector with a wet film is then immersed in a coagulation solution containing deionized water (third solvent) and N-methylpyrrolidone (second solvent) for phase transformation, wherein the mass percentage of N-methylpyrrolidone in the coagulation solution is 40%, and the coating solution and the coagulation solution are both at the temperature of 25 degrees Celsius. After being immersed in the coagulation solution for 30 seconds, the positive electrode current collector with a wet film is dried in an oven at 60 degrees Celsius, then cold pressing, slitting and cutting processes are performed and a positive electrode tab is welded to obtain a positive electrode with a porous film. The particle size distribution of inorganic particles (boehmite) is such that Dv10 is 0.9 μm, Dv50 is 1.8 μm and Dv90 is 3.0 μm.

(3) Preparation of Separator

A polyethylene porous substrate is used as a separator.

(4) Preparation of Electrolyte

A solution prepared with lithium salt $LiPF_6$ and a non-aqueous organic solvent (ethylene carbonate (EC): diethyl carbonate (DEC): ethyl methyl carbonate (EMC): vinylene carbonate (VC)=8:85:5:2, by a mass ratio) at a mass ratio of 8:92 is used as the electrolyte.

(5) Preparation of Lithium-Ion Battery

An electrode assembly is obtained by winding the positive electrode, the separator and the negative electrode, and then packaging, injection of the electrolyte, forming, and suction molding processes are performed to obtain the lithium-ion battery.

Example 18

(1) Preparation of Negative Electrode

The negative electrode active material (artificial graphite), the binder (styrene-butadiene rubber), and the conductive agent (conductive carbon black (Super P)) are mixed uniformly with the solvent (N-methylpyrrolidone (NMP)) at a mass ratio of 92:3:5 to prepare a negative slurry, then the negative slurry is coated uniformly on front and rear surfaces of the negative electrode current collector (copper foil), then a negative electrode active material layer is formed by drying the coated negative electrode current collector copper foil at 85 degrees Celsius. Inorganic particles (boehmite) are mixed with the binder (PVDF) at a volume ratio of 1.2, and then N-methylpyrrolidone (first solvent) is added and uniformly stirred to obtain a coating solution, wherein the coating solution has a solid content of 15%. The coating solution is coated onto the negative electrode current collector on which the negative electrode active material layer is provided by the dip coating method to form a wet film. The negative electrode current collector with a wet film is then immersed in a coagulation solution containing deionized water (third solvent) and N-methylpyrrolidone (second solvent) for phase transformation, wherein the mass percentage of N-methylpyrrolidone in the coagulation solution is 40%, and the coating solution and the coagulation solution are both at the temperature of 25 degrees Celsius. After being immersed in the coagulation solution for 30 seconds, the negative electrode current collector with a wet film is dried in an oven at 60 degrees Celsius, and then cold pressing, slitting and cutting processes are performed and a negative electrode tab is welded to obtain a negative electrode. The particle size distribution of inorganic particles (boehmite) is such that Dv10 is 0.9 μm, Dv50 is 1.8 μm and Dv90 is 3.0 μm.

(2) Preparation of Positive Electrode

The positive electrode active material (lithium cobaltate ($LiCoO_2$)), the binder (polyvinylidene fluoride (PVDF)), and the conductive agent (conductive carbon black (Super P)) are dissolved in the solvent (N-methylpyrrolidone (NMP)) at a mass ratio of 97:1.5:1.5. A positive slurry is prepared by stirring uniformly the mixture, then the positive slurry is coated uniformly on front and rear surfaces of the positive electrode current collector aluminum foil, then a positive electrode active material layer is formed by drying the coated positive electrode current collector aluminum foil at 85 degrees Celsius, and then cold pressing, slitting and cutting processes are performed and a positive electrode tab is welded to obtain a positive electrode.

(3) Preparation of Separator

A polyethylene porous substrate is used as a separator.

(4) Preparation of Electrolyte

A solution prepared with lithium salt $LiPF_6$ and a non-aqueous organic solvent (ethylene carbonate (EC): diethyl carbonate (DEC): ethyl methyl carbonate (EMC): vinylene carbonate (VC)=8:85:5:2, by a mass ratio) at a mass ratio of 8:92 is used as the electrolyte.

(5) Preparation of Lithium-Ion Battery

An electrode assembly is obtained by winding the positive electrode, the separator and the negative electrode, and packaging, injection of the electrolyte, forming, and suction molding processes are performed to obtain the lithium-ion battery.

Example 19

(1) Preparation of Negative Electrode

The negative electrode active material (artificial graphite), the binder (styrene-butadiene rubber), and the conductive agent (conductive carbon black (Super P)) are mixed uniformly with the solvent (N-methylpyrrolidone (NMP)) at a mass ratio of 92:3:5 to prepare a negative slurry, then the negative slurry is coated uniformly on front and rear surfaces of the negative electrode current collector (copper foil), then a negative electrode active material layer is formed by drying the coated negative electrode current collector copper foil at 85 degrees Celsius, then cold pressing, slitting and cutting processes are performed and a negative electrode tab is welded to obtain a negative electrode.

(2) Preparation of Positive Electrode

The positive electrode active material (lithium cobaltate ($LiCoO_2$)), the binder (polyvinylidene fluoride (PVDF)) and the conductive agent (conductive carbon black (Super P)) are dissolved in the solvent (N-methylpyrrolidone (NMP)) at a mass ratio of 97:1.5:1.5. A positive slurry is prepared by stirring uniformly the mixture, then the positive slurry is coated uniformly on front and rear surfaces of the positive electrode current collector aluminum foil, then a positive electrode active material layer is formed by drying the coated positive electrode current collector aluminum foil at 85 degrees Celsius. Inorganic particles (boehmite) are mixed with the binder (PVDF) at a volume ratio of 1.2, and then N-methylpyrrolidone (first solvent) is added and uniformly stirred to obtain a coating solution, wherein the coating solution has solid content of 15%. The coating solution is coated onto the positive electrode current collector on which the positive electrode active material layer is provided by the dip coating method to form a wet film. The positive electrode current collector with a wet film is then immersed in a coagulation solution containing deionized water (third solvent) and N-methylpyrrolidone (second solvent) for phase transformation, wherein the mass percentage of N-methylpyrrolidone in the coagulation solution is 40%, and the coating solution and the coagulation solution are both at the temperature of 25 degrees Celsius. After being immersed in the coagulation solution for 30 seconds, the positive electrode current collector with a wet film is dried in an oven at 60 degrees Celsius, and then cold pressing, slitting and cutting processes are performed and a positive electrode tab is welded to obtain a positive electrode with a porous film. The particle size distribution of inorganic particles boehmite is such that Dv10 is 0.9 μm, Dv50 is 1.8 μm and Dv90 is 3.0 μm.

(3) Preparation of Separator

Inorganic particles (boehmite) are mixed with the binder (PVDF) at a volume ratio of 1.2, and then N-methylpyrrolidone (first solvent) is added and uniformly stirred to obtain a coating solution, wherein the coating solution has a solid content of 15%. The coating solution is coated onto a porous substrate (polyethylene) by the dip coating method to form a wet film. The porous substrate (polyethylene) with a wet film is immersed in a coagulation solution containing deionized water (third solvent) and N-methylpyrrolidone (second solvent) for phase transformation, wherein the mass percentage of N-methylpyrrolidone in the coagulation solution is 40%, and the coating solution and the coagulation solution are both at the temperature of 25 degrees Celsius. After being immersed in the coagulation solution for 30 seconds, the porous substrate (polyethylene) with a wet film is dried in an oven at 60 degrees Celsius to obtain a separator with a porous film. The particle size distribution of inorganic particles (boehmite) is such that Dv10 is 0.9 μm, Dv50 is 1.8 μm and Dv90 is 3.0 μm.

(4) Preparation of Electrolyte

A solution prepared with lithium salt $LiPF_6$ and a non-aqueous organic solvent (ethylene carbonate (EC): diethyl carbonate (DEC): ethyl methyl carbonate (EMC): vinylene carbonate (VC)=8:85:5:2, by a mass ratio) at a mass ratio of 8:92 is used as the electrolyte.

(5) Preparation of Lithium-Ion Battery

An electrode assembly is obtained by winding the positive electrode, the separator and the negative electrode, and then packaging, injection of the electrolyte, forming, and suction molding processes are performed to obtain the lithium-ion battery.

Example 20

(1) Preparation of Negative Electrode

The negative electrode active material (artificial graphite), the binder (styrene-butadiene rubber), and the conductive agent (conductive carbon black (Super P)) are mixed uniformly with the solvent (N-methylpyrrolidone (NMP)) at a mass ratio of 92:3:5 to prepare a negative slurry, then the negative slurry is coated uniformly on front and rear surfaces of the negative electrode current collector copper foil, and then a negative electrode active material layer is formed by drying the coated negative electrode current collector copper foil at 85 degrees Celsius. Inorganic particles (boehmite) are mixed with the binder (PVDF) at a volume ratio of 1.2, and then N-methylpyrrolidone (first solvent) is added and uniformly stirred to obtain a coating solution, wherein the coating solution has a solid content of 15%. The coating solution is coated onto the negative electrode current collector on which the negative electrode active material layer is provided by the dip coating method to form a wet film. The negative electrode current collector with a wet film is immersed in a coagulation solution containing deionized water (third solvent) and N-methylpyrrolidone (second solvent) for phase transformation, wherein the mass percentage of N-methylpyrrolidone in the coagulation solution is 40%, and the coating solution and the coagulation solution are both at the temperature of 25 degrees Celsius. After being immersed in the coagulation solution for 30 seconds, the negative electrode current collector with a wet film is dried in an oven at 60 degrees Celsius, then cold pressing, slitting and cutting processes are performed and a negative electrode tab is welded to obtain a negative electrode with a porous film. The particle size distribution of inorganic particles (boehmite) is such that Dv10 is 0.9 μm, Dv50 is 1.8 μm and Dv90 is 3.0 μm.

(2) Preparation of Positive Electrode

The positive electrode active material (lithium cobaltate ($LiCoO_2$)), the binder (polyvinylidene fluoride (PVDF)), and the conductive agent (conductive carbon black (Super P)) are dissolved in the solvent (N-methylpyrrolidone (NMP)) at a mass ratio of 97:1.5:1.5. A positive slurry is prepared by stirring uniformly the mixture, then the positive slurry is coated uniformly on front and rear surfaces of the positive electrode current collector aluminum foil, then a positive electrode active material layer is formed by drying the coated positive electrode current collector aluminum foil at 85 degrees Celsius, then cold pressing, slitting and cutting processes are performed and a positive electrode tab is welded to obtain a positive electrode.

(3) Preparation of Separator

Inorganic particles (boehmite) are mixed with the binder (PVDF) at a volume ratio of 1.2, and then N-methylpyrrolidone (first solvent) is added and uniformly stirred to obtain a coating solution, wherein the coating solution has a solid content of 15%. The coating solution is coated onto a porous substrate (polyethylene) using the dip coating method to form a wet film. The porous substrate (polyethylene) with a wet film is immersed in a coagulation solution containing deionized water (third solvent) and N-methylpyrrolidone (second solvent) for phase transformation, wherein the mass percentage of N-methylpyrrolidone in the coagulation solution is 40%, and the coating solution and the coagulation solution are both at the temperature of 25 degrees Celsius. After being immersed in the coagulation solution for 30 seconds, the porous substrate (polyethylene) with a wet film is dried in an oven at 60 degrees Celsius to obtain a separator with a porous film. The particle size distribution of inorganic particles (boehmite) is such that Dv10 is 0.9 μm, Dv50 is 1.8 μm and Dv90 is 3.0 μm.

(4) Preparation of Electrolyte

A solution prepared with lithium salt $LiPF_6$ and a non-aqueous organic solvent (ethylene carbonate (EC): diethyl carbonate (DEC): ethyl methyl carbonate (EMC): vinylene carbonate (VC)=8:85:5:2, by a mass ratio) at a mass ratio of 8:92 is used as the electrolyte.

(5) Preparation of Lithium-Ion Battery

An electrode assembly is obtained by winding the positive electrode, the separator and the negative electrode, and then packaging, injection of the electrolyte, forming, and suction molding processes are performed to obtain the lithium-ion battery.

Comparative Example 1

In this comparative example, the preparation methods for the negative electrode, the positive electrode, the electrolyte, and the lithium-ion battery are the same as the corresponding preparation methods described in Example 1.

The separator is prepared as follows.

The boehmite and polyvinylidene fluoride at a volume ratio of 1.2 are added into deionized water and uniformly mixed to prepare a slurry, and the solid content of the slurry is 45%. Then, the slurry is uniformly coated onto front and rear surfaces of the porous substrate (polyethylene) using the micro gravure coating method to form a wet film. After the wet film is dried in an oven, a separator is obtained. The particle size distribution of inorganic particles (boehmite) is that Dv10 is 0.9 μm, Dv50 is 1.8 μm and Dv90 is 3.0 μm.

Comparative Example 2

In this comparative example, the preparation methods for the negative electrode, the positive electrode, the electrolyte, and the lithium-ion battery are the same as the corresponding preparation methods described in Example 1. The preparation method of the separator is the same as that described in Example 1, except that the solid content of the coating solution is 4%.

Comparative Example 3

In this example, the preparation methods for the negative electrode, the positive electrode, the electrolyte, and the lithium-ion battery are the same as the corresponding preparation methods described in Example 1. The preparation method of the separator is the same as that described in Example 1, except that the solid content of the coating solution is 30%.

Parameters of Examples 1-20 and comparative examples 1-3 are shown in Table 1 below.

TABLE 1

| | Position of porous film | Solid content of the coating solution | Inorganic particle/μm | | | | Second solvent | Content of second solvent in coagulation solution |
|---|---|---|---|---|---|---|---|---|
| | | | Type | Dv10 | Dv50 | Dv90 | | |
| Example 1 | surfaces of separator | 7% | boehmite | 0.9 | 1.8 | 3.0 | NMP | 40% |
| Example 2 | surfaces of separator | 10% | boehmite | 0.9 | 1.8 | 3.0 | NMP | 40% |
| Example 3 | surfaces of separator | 15% | boehmite | 0.9 | 1.8 | 3.0 | NMP | 40% |
| Example 4 | surfaces of separator | 20% | boehmite | 0.9 | 1.8 | 3.0 | NMP | 40% |
| Example 5 | surfaces of separator | 25% | boehmite | 0.9 | 1.8 | 3.0 | NMP | 40% |
| Example 3 | surfaces of separator | 15% | boehmite | 0.9 | 1.8 | 3.0 | NMP | 40% |
| Example 6 | surfaces of separator | 15% | boehmite | 0.9 | 1.8 | 3.0 | DMAC | 40% |
| Example 7 | surfaces of separator | 15% | boehmite | 0.9 | 1.8 | 3.0 | DMF | 40% |
| Example 8 | surfaces of separator | 15% | boehmite | 0.015 | 0.2 | 1.5 | NMP | 40% |
| Example 9 | surfaces of separator | 15% | boehmite | 0.2 | 1.0 | 2.0 | NMP | 40% |
| Example 3 | surfaces of separator | 15% | boehmite | 0.9 | 1.8 | 3.0 | NMP | 40% |
| Example 10 | surfaces of separator | 15% | boehmite | 1.6 | 2.6 | 4.6 | NMP | 40% |
| Example 11 | surfaces of separator | 15% | boehmite | 2.2 | 3.5 | 5.8 | NMP | 40% |
| Example 12 | surfaces of separator | 15% | boehmite | 3.0 | 5.0 | 10.0 | NMP | 40% |
| Example 13 | surfaces of separator | 15% | boehmite | 0.9 | 1.8 | 3.0 | NMP | 20% |
| Example 3 | surfaces of separator | 15% | boehmite | 0.9 | 1.8 | 3.0 | NMP | 40% |
| Example 14 | surfaces of separator | 15% | boehmite | 0.9 | 1.8 | 3.0 | NMP | 60% |
| Example 15 | surfaces of separator | 15% | alumina | 0.9 | 1.8 | 3.0 | NMP | 40% |
| Example 16 | surfaces of separator | 15% | magnesium hydroxide | 0.9 | 1.8 | 3.0 | NMP | 40% |
| Example 3 | surfaces of separator | 15% | boehmite | 0.9 | 1.8 | 3.0 | NMP | 40% |
| Example 17 | surfaces of positive electrode | 15% | boehmite | 0.9 | 1.8 | 3.0 | NMP | 40% |
| Example 18 | surfaces of negative electrode | 15% | boehmite | 0.9 | 1.8 | 3.0 | NMP | 40% |
| Example 19 | surfaces of separator and positive electrode | 15% | boehmite | 0.9 | 1.8 | 3.0 | NMP | 40% |

TABLE 1-continued

| | Position of porous film | Solid content of the coating solution | Inorganic particle/μm | | | | Second solvent | Content of second solvent in coagulation solution |
|---|---|---|---|---|---|---|---|---|
| | | | Type | Dv10 | Dv50 | Dv90 | | |
| Example 20 | surfaces of separator and negative electrode | 15% | boehmite | 0.9 | 1.8 | 3.0 | NMP | 40% |
| Comparative Example 1 | surfaces of separator | / | boehmite | 0.9 | 1.8 | 3.0 | / | / |
| Comparative Example 2 | surfaces of separator | 4% | boehmite | 0.9 | 1.8 | 3.0 | NMP | 40% |
| Comparative Example 3 | surfaces of separator | 30% | boehmite | 0.9 | 1.8 | 3.0 | NMP | 40% |

Performance Test

The performances of the porous film and the lithium-ion battery including the porous film prepared in Examples 1-20 and comparative examples 1-3 are tested, and the test method is described as follows.

(1) Thickness Test of Porous Film

A separator sample or an electrode sample provided with a porous film is placed on a thickness gauge (Model VL-50 LITEMATIC from Naitutoyo company) using a 5 mm flat bottom probe with a speed of 50 mm/min and a pressure of 0.01 N. Each separator sample or electrode sample provided with the porous film is measured for 60 thickness points, and the average thickness is taken as the measured value. The thickness of the porous film is equal to the thickness of the separator or the electrode coated with the porous film minus the thickness of the separator sample or the electrode sample without the porous film. In a case that there are two porous films, the thickness is divided by 2 to obtain the thickness of each porous layer.

(2) Gas Permeability Test of Porous Film

A 100 mm×100 mm separator sample provided with a porous film is cut and tested using a US Gurley 4110 N permeability tester with a test gas of 100 cc, and the period that the test gas passes completely through the separator provided with the porous film is recorded as a Gurley value. The Gurley value of the porous film is equal to the Gurley value of the separator provided with the porous film minus the Gurley value of the separator without the porous film (i.e., a pure porous substrate). In a case that the electrode includes a porous film, since the current collector itself is gas-tight, the gas permeability of the porous film cannot be evaluated according to such a method.

(3) Porosity Test of Porous Film

The length, width, and thickness of a separator sample or an electrode sample provided with a porous film are measured, the thickness of the porous film is obtained using the above-described method, and the apparent volume V1 of the porous film is obtained through calculation. The true volume V20 of the separator sample or the electrode sample provided with the porous film is measured using a true density meter (AccuPyc II Model 1340 Gas Pycnometer, Micromeritics Company), and the true volume V0 of the separator sample or the electrode sample without the porous film having the same area is measured. The true volume V2 of the porous film is equal to V20−V0, and the porosity of the porous film is equal to 1−V2/V1.

(4) Average Pore Size Test of Porous Film

The area of the porous film that needs to be measured is observed using the Model Sigma-02-33 Scanning Electron Microscope from Zeiss, and images are saved. The maximum diameter L1 in the transverse direction and the maximum diameter L2 in the longitudinal direction for each pore in the images are measured, and the pore size of the pore is equal to (L1+L2)/2. Pore sizes of 200 adjacent pores are measured and an average value thereof is taken as the average pore size of the porous film.

(5) Pore Size Distribution Coefficient Test of Porous Film

The area of the porous film that needs to be measured is observed using the Model Sigma-02-33 Scanning Electron Microscope from Zeiss, and images are saved. Pore sizes of 200 adjacent pores are measured to obtain a pore size distribution curve. R10 represents pore sizes which reach 10% of the cumulative pore sizes from the side of small pore size in the pore size distribution curve (the pore sizes of 10% of the pores are less than R10). R90 represents pore sizes which reach 90% of the cumulative pore sizes from the side of small pore size in the pore size distribution curve (the pore sizes of 90% of the pores are less than R90). The pore size distribution coefficient D is equal to R90/R10. The closer to 1 the pore size distribution coefficient D is, the more uniform the pore sizes will be. The higher the pore size distribution coefficient D is, the poorer the uniformity of the pore sizes will be.

(6) Average Wall Thickness Test Between Adjacent Pores in the Porous Film

The area of the porous film that needs to be measured is observed using the Model Sigma-02-33 Scanning Electron Microscope from Zeiss, and images are saved. The wall thicknesses between each two adjacent pores among 200 adjacent pores are measured and an average value thereof is taken as the average wall thickness between adjacent pores in the porous film.

(7) Rate Performance Test of Lithium-Ion Battery

At 25 degrees Celsius, the lithium-ion battery is discharged to 3.0 V at a constant current of 0.2 C, rested for 10 minutes, then charged to 4.4 V at a constant current of 0.7 C, then charged to 0.02 C at a constant voltage of 4.4 V, and rested for 10 min, and is further discharged at a constant current of 0.2 C until the voltage is 3.0 V. The discharge capacity at this point is measured and recorded as Q1. Then, the lithium-ion battery is charged to 4.4 V at a constant current of 0.7 C, is then charged to 0.02 C at a constant voltage of 4.4 V, rested for 10 minutes, then discharged at a constant current of 2 C until the voltage is 3.0 V. The discharge capacity at this point is measured and recorded as Q2.

2 C/0.2 C rate performance (%) of the lithium-ion battery is equal to $Q2/Q1 \times 100\%$.

(8) Cycle Performance Test of Lithium-Ion Battery

At 25 degrees Celsius, the lithium-ion battery is charged to 4.4 V at a constant current of 0.7 C, is then charged to 0.02 C at a constant voltage of 4.4 V, rested for 10 minutes, is discharged to 3.0 V at a constant current of 1 C, and rested for 10 minutes. The discharge capacity at this point is measured and recorded as Q3. The above-described procedures are regarded as one cycle of charge and discharge; 200 cycles are performed, and the discharge capacity after the 200 cycles is recorded as Q4.

The capacity retention rate (%) of the lithium-ion battery after 200 cycles is equal to Q4/Q3×100%.

Test Results

Figure 3:
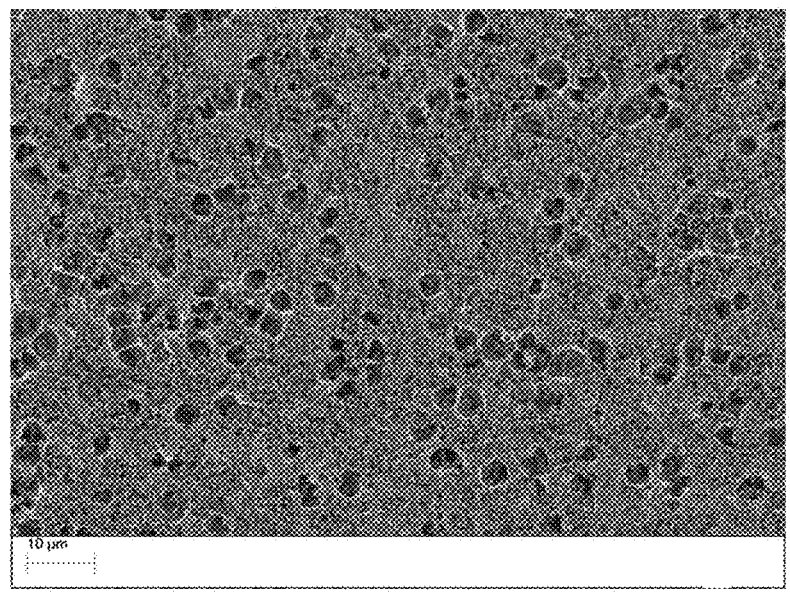
FIG. 3 is an electronic microscope image (1000 times magnification) of the pore structure of the lower surface of the porous film according to comparative example 3.

The measured results of Examples 1-20 and comparative examples 1-3 are shown in Table 2 below.

the coating solution is too high (for example, comparative example 3), the porosity of the porous film is too low and the gas permeability of the porous film is very poor. Referring to FIG. 3, it can be seen that a small pore size structure tends to be formed in the porous film, and the average wall thickness between the adjacent pores is large, which seriously affects the cycle performance and rate performance of the lithium-ion battery.

As can be seen from the analysis of the relevant data of Example 3 and Examples 15 and 16, the rate performance and cycle performance of the lithium-ion battery is more

TABLE 2

| | Porous film | | | | | | Lithium-ion battery | |
|---|---|---|---|---|---|---|---|---|
| | Gurley value (s/100 cc) | Thickness (μm) | Porosity | Average pore size (μm) | Pore size distribution coefficient D | Average wall thickness (nm) | Rate performance | Cycle performance |
| Example 1 | 24 | 2.4 | 58% | 12 | 1.5 | 20 | 80.50% | 86.70% |
| Example 2 | 28 | 2.4 | 55% | 7.8 | 2.1 | 90 | 84.20% | 91.10% |
| Example 3 | 32 | 2.4 | 53% | 5 | 2.5 | 180 | 87.30% | 95.30% |
| Example 4 | 41 | 2.4 | 49% | 3.6 | 3.6 | 320 | 83.90% | 90.70% |
| Example 5 | 55 | 2.4 | 46% | 1.5 | 4.5 | 500 | 79.70% | 85.30% |
| Example 3 | 32 | 2.4 | 53% | 5 | 2.5 | 180 | 87.30% | 95.30% |
| Example 6 | 35 | 2.4 | 52% | 4.5 | 3 | 220 | 85.10% | 92.30% |
| Example 7 | 39 | 2.4 | 50% | 3.7 | 3.2 | 300 | 82.90% | 90.00% |
| Example 8 | 45 | 2.4 | 48% | 3.0 | 3.8 | 410 | 84.50% | 91.50% |
| Example 9 | 40 | 2.4 | 50% | 4.0 | 3.4 | 320 | 85.40% | 92.10% |
| Example 3 | 32 | 2.4 | 53% | 5 | 2.5 | 180 | 87.30% | 95.30% |
| Example 10 | 30 | 3.0 | 54% | 5.5 | 2.2 | 160 | 86.30% | 92.40% |
| Example 11 | 28 | 4.0 | 55% | 6.9 | 2.0 | 100 | 82.40% | 89.80% |
| Example 12 | 26 | 8.0 | 57% | 8.9 | 1.8 | 70 | 80.20% | 86.50% |
| Example 13 | 39 | 2.4 | 51% | 8.1 | 3.6 | 50 | 82.20% | 89.30% |
| Example 3 | 32 | 2.4 | 53% | 5 | 2.5 | 180 | 87.30% | 95.30% |
| Example 14 | 34 | 2.4 | 52% | 3.5 | 2.3 | 300 | 84.10% | 90.20% |
| Example 15 | 43 | 2.4 | 49% | 2.5 | 3.0 | 240 | 80.20% | 85.20% |
| Example 16 | 38 | 2.4 | 51% | 3.1 | 2.9 | 230 | 85.20% | 89.70% |
| Example 3 | 32 | 2.4 | 53% | 5 | 2.5 | 180 | 87.30% | 95.30% |
| Example 17 | / | 2.4 | 53% | 4.9 | 2.6 | 180 | 86.90% | 94.60% |
| Example 18 | / | 2.4 | 53% | 5.1 | 2.6 | 180 | 87.20% | 94.90% |
| Example 19 | / | 2.4 | 53% | 4.9 | 2.7 | 180 | 85.50% | 93.50% |
| | 32 | 2.4 | 53% | 5 | 2.5 | 180 | | |
| Example 20 | / | 2.4 | 53% | 5.1 | 2.6 | 180 | 85.70% | 92.90% |
| | 32 | 2.4 | 53% | 5 | 2.4 | 180 | | |
| Example 1 | 36 | 2.4 | 46% | / | / | / | 68.80% | 70.10% |
| Example 2 | 20 | 2.4 | 61% | 18 | 1.3 | 12 | 73.70% | 76.30% |
| Example 3 | 91 | 2.4 | 42% | 0.5 | 5.3 | 600 | 72.70% | 73.60% |

As can be seen from the relevant data in Table 2 above, the porous film according to the Examples of the present application has a higher porosity, and the lithium-ion battery has better rate performance and cycle performance.

As can be seen from the analysis of the relevant data of Examples 1-5 and comparative examples 2-3, if the solid content of the coating solution is increased, the viscosity of the coating solution is increased, the exchange speed between the non-solvent (third solvent) in the coagulation solution and the organic solvent (first solvent) in the coating solution becomes lower, the average pore size of the formed porous film is decreased, the average wall thickness between the adjacent pores is increased, the porosity of the porous film is decreased, and the gas permeability of the porous film is deteriorated. However, if the solid content of the coating solution is too low (for example, comparative example 2), it is difficult to form a porous film, and the electrochemical performance of the lithium-ion battery is drastically degraded. The porous film in Example 3 has a larger average pore size, uniform pore size distribution, and a small average wall thickness between adjacent pores. If the solid content of significantly improved with the inorganic particles containing polar functional groups. This is because the surface of the inorganic particles containing polar functional groups is more easily combined with the non-solvent (third solvent), i.e., deionized water in the coagulating solution, which is advantageous for the diffusion of the deionized water into the porous film along the surface of the inorganic particles, and thus large pore structures are formed in the vicinity of the inorganic particles, and the pore structures with large average pore sizes and a small average wall thickness between the adjacent pores are easily obtained.

As can be seen from the analysis of the relevant data of Example 3, Example 6 and Example 7, if different organic solvents (second solvent) are selected, the pore structures in the obtained porous films are also different. The porous film formed with NMP has the largest average pore size and the highest porosity, the porous film formed with DMF has the smallest average pore size and the lowest porosity, and the porous film formed with DMAC has the average pore size and a porosity between those of the porous films formed with NMP and DMF respectively.

As can be seen from the analysis of the relevant data of Example 3 and Examples 8-12, the particle size of the inorganic particles has an effect on the improvement of the rate performance and cycle performance of the lithium-ion battery. If the particle size of the inorganic particles is increased, the exchange speed between the non-solvent (third solvent) in the coagulation solution and the organic solvent (first solvent) in the coating solution is increased, the development of the pore structure is faster, the average pore size of the formed pore is increased, and the average wall thickness between adjacent pores is decreased.

As can be seen from the analysis of the relevant data of Example 3 and Examples 13-14, the content of the organic solvent (second solvent) in the coagulation solution has a great effect on the rate performance and cycle performance of the lithium-ion battery. If the content of the organic solvent (second solvent) in the coagulation solution is reduced, the average pore size of the pores in the porous film is increased. As can be seen from the analysis of the relevant data of Example 1 and Examples 17-20, the porous film of the application may be formed separately on the separator, the positive electrode, and the negative electrode, or may also be formed on both the separator and the positive electrode or formed on both the separator and the negative electrode. The lithium-ion battery has good rate performance and cycling performance in either case.

It should be understood by those skilled in the art that the above-described Examples are only illustrative examples. Various changes, substitutions, and alterations could be made to the application without departing from the spirit and scope of the application.

What is claimed is:

1. A porous film, comprising:
a binder; and
inorganic particles;
wherein the porous film comprises pores formed by the binder, the pores at least comprises a part of the inorganic particles, wherein the inorganic particles have particle sizes that Dv10 is in a range of 0.015 µm to 3 µm, Dv50 is in a range of 0.2 µm to 5 µm, and Dv90 is in a range of 1 µm to 10 µm; Dv10 of the inorganic particles is less than Dv50 of the inorganic particles, and Dv50 of the inorganic particles is less than Dv90 of the inorganic particles, and the inorganic particles have particle sizes that the ratio of Dv90 to Dv10 is in a range of 2 to 100.

2. The porous film according to claim 1, wherein the porous film has an average pore size of 0.3 µm to 20 µm.

3. The porous film according to claim 1, wherein the average wall thickness between the pores is in a range of 20 nm to 500 nm.

4. The porous film according to claim 1, wherein a pore size distribution coefficient of the pores in the porous film is in a range of 1 to 5.

5. The porous film according to claim 1, wherein the inorganic particles are at least one selected from the group consisting of alumina, silica, magnesia, titanium oxide, hafnium dioxide, tin oxide, cerium dioxide, nickel oxide, zirconia, zinc oxide, calcium oxide, boehmite, aluminum hydroxide, magnesium hydroxide, calcium hydroxide, and barium sulfate.

6. The porous film according to claim 1, wherein the binder is at least one selected from the group consisting of polyvinylidene fluoride, vinylidene fluoride-hexafluoropropylene copolymer, polyamide, polyacrylonitrile, polyacrylate, polyacrylic acid, polyacrylic acid salt, sodium carboxymethylcellulose, polyvinylpyrrolidone, polyvinyl ether, polymethyl methacrylate, polytetrafluoroethylene and polyhexafluoropropylene.

7. The porous film according to claim 1, wherein the porous film has a porosity of 20% to 90%.

8. The porous film according to claim 1, wherein the porous film has a thickness of 0.2 to 10 µm.

9. The porous film according to claim 1, wherein a volume ratio of the inorganic particles to the binder is in a range of 0.2 to 3.0.

10. A lithium-ion battery, comprising:
a positive electrode;
a negative electrode;
a separator, arranged between the positive electrode and the negative electrode;
non-aqueous electrolyte; and
a porous film, comprising:
a binder; and
inorganic particles;
wherein the porous film comprises pores formed by the binder, the pores at least comprises a part of the inorganic particles, wherein the inorganic particles have particle sizes that Dv10 is in a range of 0.015 µm to 3 µm, Dv50 is in a range of 0.2 µm to 5 µm, Dv90 is in a range of 1 µm to 10 µm; Dv10 of the inorganic particles is less than Dv50 of the inorganic particles, and Dv50 of the inorganic particles is less than Dv90 of the inorganic particles; and the inorganic particles have particle sizes that the ratio of Dv90 to Dv10 is in a range of 2 to 100.

11. The lithium-ion battery according to claim 10, wherein the porous film has an average pore size of 0.3 µm to 20 µm.

12. The lithium-ion battery according to claim 10, wherein the average wall thickness between the pores is in a range of 20 nm to 500 nm.

13. The lithium-ion battery according to claim 10, wherein a pore size distribution coefficient of the pores in the porous film is in a range of 1 to 5.

14. The lithium-ion battery according to claim 10, wherein the inorganic particles are at least one selected from the group consisting of alumina, silica, magnesia, titanium oxide, hafnium dioxide, tin oxide, cerium dioxide, nickel oxide, zirconia, zinc oxide, calcium oxide, boehmite, aluminum hydroxide, magnesium hydroxide, calcium hydroxide, and barium sulfate.

15. The lithium-ion battery according to claim 10, wherein the binder is at least one selected from the group consisting of polyvinylidene fluoride, vinylidene fluoride-hexafluoropropylene copolymer, polyamide, polyacrylonitrile, polyacrylate, polyacrylic acid, polyacrylic acid salt, sodium carboxymethylcellulose, polyvinylpyrrolidone, polyvinyl ether, polymethyl methacrylate, polytetrafluoroethylene and polyhexafluoropropylene.

16. The lithium-ion battery according to claim 10, wherein the porous film has a porosity of 20% to 90%.

17. The lithium-ion battery according to claim 10, wherein the porous film has a thickness of 0.2 to 10 µm.

18. The lithium-ion battery according to claim 10, wherein a volume ratio of the inorganic particles to the binder is in a range of 0.2 to 3.0.

19. The lithium-ion battery according to claim 10, wherein the porous film is arranged on a surface of at least one selected from the group consisting of the positive electrode, the negative electrode and the separator.

* * * * *